Dec. 17, 1968     A. K. PFAFFENBACH     3,416,226
PRUNER
Filed Sept. 16, 1966
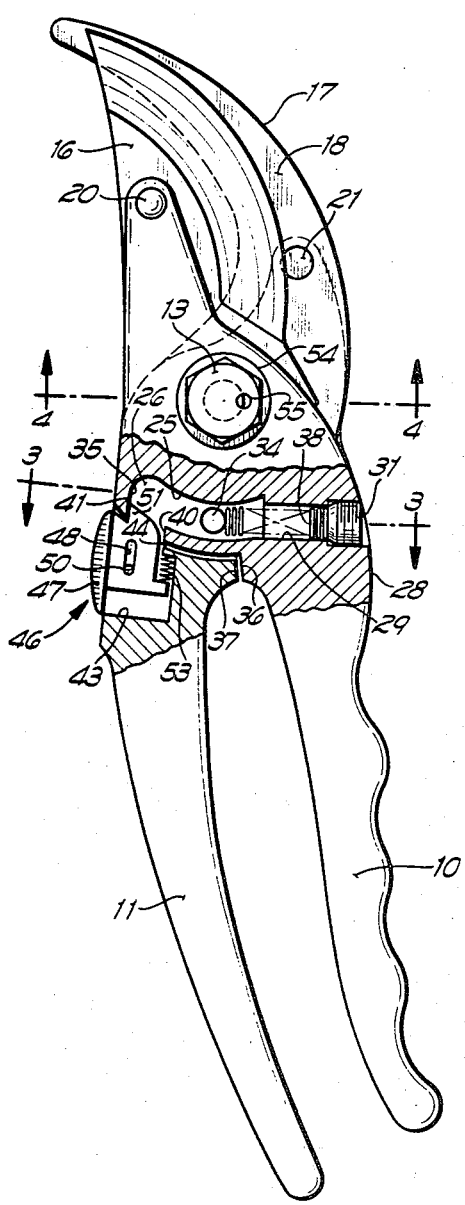
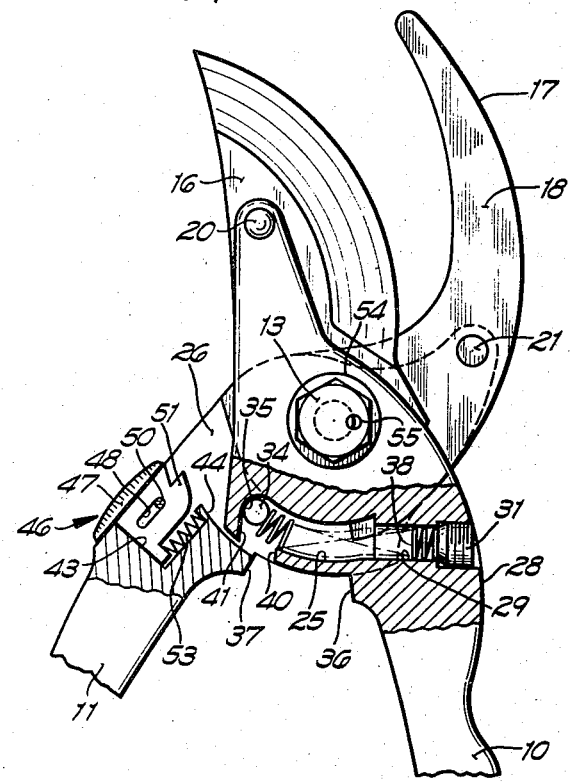
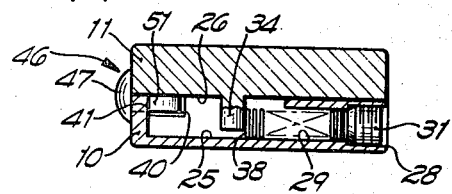
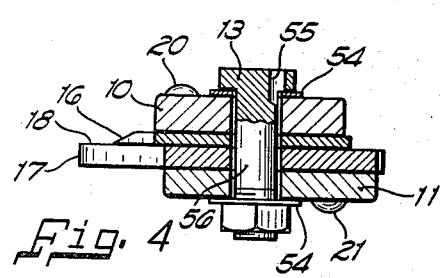
INVENTOR.
Arthur K. Pfaffenbach
BY
Robert W. Lattuern
Attorney United States Patent Office 3,416,226
Patented Dec. 17, 1968

1

3,416,226
PRUNER
Arthur K. Pfaffenbach, Watertown, Wis., assignor to McGraw-Edison Company, Milwaukee, Wis., a corporation of Delaware
Filed Sept. 16, 1966, Ser. No. 579,947
7 Claims. (Cl. 30—261)

ABSTRACT OF THE DISCLOSURE

A pruner having crossed pivoted levers, and a pruner opening mechanism including a recess defined in one lever open to the engaging faces of the levers and a spring positioned in this recess and held therein by a closure inserted from the exterior of the pruner over one end of the recess.

This invention relates to pruning shears and similar tools utilizing crossed pivoted levers.

For safety and ease of operation, it is desirable to have a shearing device that is free of external parts which might injure the operator's hand or become fouled by exterior objects especially during operation, such as a pruner which is being used among thickly set foliage. In the tool of the present invention, the biasing spring urging the handles apart is wholly contained within the handles to avoid interfering with the operation of the spring and also to avoid interference with exterior objects which the tool may encounter. In addition, a simple latching mechanism for holding the shears in the closed position is disposed within the handle structure with only the operator portion exposed and a simple lubrication passage through the pivot stud effects lubrication of the journaled portions without presenting any further projecting portions.

It is an object of this invention to provide an improved pivoted crossed lever shearing tool such as a pruner.

It is a further object of this invention to provide a shearing tool which is biased to an open position by a concealed biasing spring.

It is also an object of this invention to provide a pivoting cross lever tool with an improved latch and lubrication means.

These and other objects and advantages of this invention will become apparent from the following description when taken in connection with the accompanying drawings, wherein:

FIGURE 1 is a side elevation view of a pruner incorporating the invention, shown partially broken away and partially in section;

FIGURE 2 is a partial elevation view of the pruner of FIGURE 1 with handle portions broken away and the crossed levers shown in the open position;

FIGURE 3 is a section view taken along line 3—3 of FIGURE 1; and,

FIGURE 4 is a section view taken along line 4—4 of FIGURE 1.

In FIGURE 1 is illustrated an example of a crossed lever tool in the form of a pair of pruning shears of the pass through type which utilizes a steel blade and a steel pruning hook. The tool shown comprises two levers or handles 10 and 11 that as shown in the drawings are die castings formed of a soft but strong metal such as an alloy of aluminum which are joined by a fulcrum bolt 13. The lever 10 is formed with a depressed seat to receive the steel blade 16 which is supported substantially in the plane of the joint between the levers. In a similar manner the lever 11 has a depressed seat to receive the steel pruning hook 17 which presents a surface 18 substantially in the plane of the joint between the levers.

As seen in FIGURE 4, the fulcrum bolt passes through aligned apertures in the handles 10 and 11, blade 16 and pruning hook 17. The blade 16 is secured to the handle 10 by a rivet 20 and relative pivotal movement therebetween is prevented by the engagement between an edge surface of the blade and the confronting surface presented by the handle along the recess in which the blade is received, while pruning hook 17 is attached to handle 11 by rivet 21 with relative pivotal movement between handle and pruning hook prevented by the engagement of the confronting surfaces of the steel hook and the shoulder of the handle recess in which the pruning hook is received.

An arcuate recess 25 is formed in the handle 10 extending from the interfacial surface which confronts the surface 26 of handle 11. Extending from the lateral surface 28 of the handle is a bore 29 which is aligned with one end of the recess 25 with the outer end portion of the bore having internal threads which receive a set screw 31. The handle 11 has a projecting cylindrical stud 34 extending from the interfacial surface 26 as an integral part thereof which enters the recess 25 in handle 10. The maximum angular opening between blade 16 and pruning hook 17 is determined by the abutting relation between the stud 34 and the recess end wall 35 as illustrated in FIGURE 2 while the maximum travel of the handles and thereby the blade and impruning hook in the opposite pivotal direction is limited by the abutting relation of the handle shoulders 36 and 37. A helical compression spring 38 is disposed in the passageway defined by the recess 25 in combination with the bore 29. One end of spring 38 bears against stud 34 carried by handle 11 and the opposite end of the spring bears against the end of set screw 31 which closes the end of the bore 29 so that spring effectively urges the handles 10 and 11 apart. Since the interfacial surface 26 of handle 11 encloses the recess 25 during all positions of pivotal relation between the handles 10 and 11, the spring is fully enclosed in each axial direction with respect to the pivotal motion bteween the handles during all positions of pivotal relation of the pruner.

A small slotted opening 40 is provided in the wall of the handle 10 affording a shoulder surface 41. The handle 11 has a slot 43 extending from the shoulder 44 which has one major wall surface coplanar with the interfacial surface 26 confronting the handle 10. Disposed in the handle slot 43 is a locking latch 46 which presents the projecting operating surface 47 that lies closely along the exterior surface of handle 11. The locking latch 46 has an elongated aperture 48 extending generally parallel to the operating portion of the latch and is secured to the handle by a lock pin 50 carried by the handle 11 and received through the elongated opening 48. The locking latch 46 may be reciprocated forward and back between the positions shown in FIGURES 1 and 2 respectively. In the position illustrated in FIGURE 1, the forward hook portion 51 engages the shoulder 41 of handle 10 to retain the handles in the closed inoperative position against the force of the biasing spring 38. In the alternative locking latch 46 may be moved to a rearward position where the hook portion 51 is totally removed from interferences with the handle 10. The helical spring 53 bears at opposite ends against the wall of the slot in handle 11 and the projection extending from the locking lever 46.

The levers 10, 11 and the respective blade 16 and hook 17 assembled thereto as integral portions are pivotally interconnected by the fulcrum bolt 13 which extends through both handles, the blade and pruning hook and flat washers 54 disposed at either lateral side of the assembly as shown in FIGURE 4. To provide for lubrication of the pruner following the initial assembly, a bore 55 is drilled through the fulcrum bolt parallel to the axis which intersects the cylindrical surface 56 of the bolt shank and extends beyond the flat washer 54 adjacent the bolt head.

In operation, the locking lever 46 which presents a minimal exterior projection from the handle may be reciprocated by the thumb of the hand of the operator which holds the shears while the biasing spring 38 that urges the handles apart is wholly enclosed by the handles 10 and 11 with the set screw 31 which functions as a closure in the bore 29 recessed beneath the handle surface 28. The locking latch 46 is moved manually against the force of spring 53 to effect locked engagement between hook 51 and shoulder 41. When it is desired to release the locking latch, the operator need only draw the handles 10 and 11 toward one another to release the frictional engagement between hook 51 and shoulder 41 whereupon the spring 53 will move the locking latch to the inoperative position shown in FIGURE 2. Further, the provision for lubrication is provided by the bore 55 in the fulcrum bolt 13 which affords lubrication means without providing any portion or accessory which projects beyond the surface of the bolt head.

Although but one embodiment has been shown and described, it will be apparent to those skilled in the art that various changes and modifications may be made therein without departing from the spirit of the invention or from the scope of the appended claims.

I claim:

1. In a tool of a pivoted crossed lever type, first and second handles pivotally connected to one another, said first and second handles having respectively opposed first and second surfaces adjacent the pivot axis therebetween, said first handle having a slotted portion formed as a recess extending from said first opposed surface; a stud carried by said second handle projecting from said second opposed surface and extending into said slotted portion; a passageway formed in said first handle and aligned with said slotted portion recess and having an opening at the exterior surface of said handles; closure means secured in said passageway and received through said opening; and a compression spring disposed in said passageway and said slotted portion having one end portion exerting a force against said closure means and the opposite end bearing against said stud whereby said handles are urged apart by said spring.

2. The tool of claim 1 wherein said first and second handles have opposed shoulder portions which are abuttable to limit relative pivotal movement between said handles in one pivotal direction and said stud engages one end of said slotted portion to limit relative pivotal movement of said handles in the direction opposite said one pivotal direction.

3. The tool of claim 1 wherein said second opposing surface wholly covers the lateral opening of said slotted portion at any operating position of relative pivotal relation between said handles.

4. The tool of claim 1 wherein said handles are pivotally connected to one another by a fulcrum bolt having head and shank portions with the shank portion journaled within aligned apertures in said first and second handles having nonaxial bore through the head of said bolt which extends at least partially along the shank portion of said bolt as a groove in the peripheral surface of said shank portion.

5. In a tool of the pivoted cross lever type, a first handle including a first cooperating shearing portion integral therewith; a second handle including a second cooperating shearing portion integral therewith; means pivotally interconnecting said first and second handles with said first and second shearing portions disposed in adjacent, relatively movable, shearing cooperation; said first and second handle respectively presenting closely confronting first and second opposed surfaces; an arcuate slotted recess extending into said first handle from said first opposed surface, said second opposed surface laterally enclosing said slotted opening; a stud secured to said second handle and projecting into said first handle slotted recess and a helical compression spring disposed in said slotted recess to exert a repelling force between said stud and said first handle whereby said first and second handles are urged to part; a bore extending from an exposed surface of said first handle aligned with one end of said recess to form a continuous passageway with said recess and a removable closure member disposed in said bore and recessed below the adjoining first handle surface, and said compression spring having one end thereof exerting a compressive force against said closure member.

6. In a tool of the pivoted cross lever type, a first handle including a first cooperating shearing portion integral therewith; a second handle including a second cooperating shearing portion integral therewith; means pivotally interconnecting said first and second handles with said first and second shearing portions disposed in adjacent, relatively movable, shearing cooperation, said first and second handle respectively presenting closely confronting first and second opposed surfaces; an arcuate slotted recess extending into said first handle from said first opposed surface, said second opposed surface laterally enclosing said slotted opening; a stud secured to said second handle and projecting into said first handle slotted recess and a helical compression spring disposed in said slotted recess to exert a repelling force between said stud and said first handle whereby said first and second handles are urged to part, said first and second handles having a first position of relative pivotal relation therebetaween and further comprising a circular edge portion presented by said first handle; a depression in said edge portion; a shoulder surface presented by said second handle that opposes said edge portion; a slot in said second handle extending from said confronting shoulder; and a locking latch mounted on said second handle for reciprocating movement in said slot with a hook portion formed as an integral part of said locking latch engageable with said depression to retain said first and second handles in said first position.

7. The tool of claim 6 further comprising biasing means housed within said slot in said second handle and engaging said second handle and said locking latch to urge said locking latch away from a position of engagement with said first handle.

References Cited

UNITED STATES PATENTS

| 1,047,002 | 12/1912 | Diehl | 30—271 X |
| 2,385,835 | 10/1945 | Neal | 30—250 |
| 2,885,781 | 5/1959 | Bauer | 30—271 |

FOREIGN PATENTS 785,709  11/1957  Great Britain.

ROBERT C. RIORDON, *Primary Examiner.*

J. C. PETERS, *Assistant Examiner.*

U.S. Cl. X.R.

30—271, 262